Patented June 29, 1937

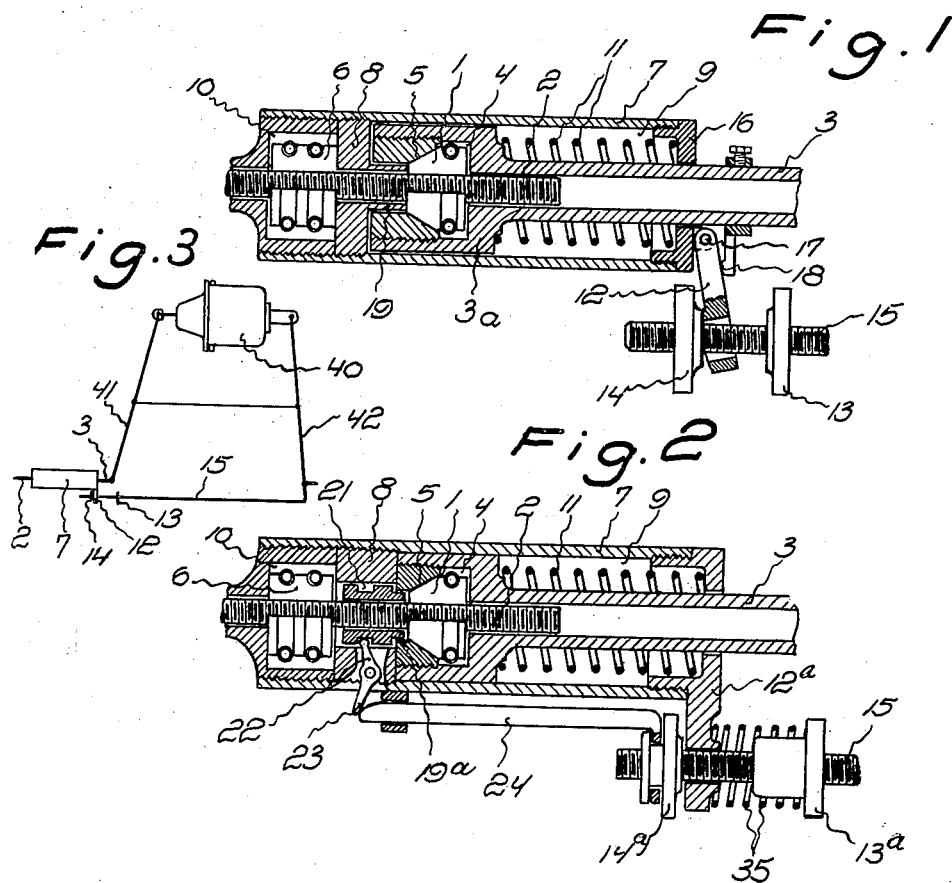

2,084,989

UNITED STATES PATENT OFFICE 2,084,989

AUTOMATIC SLACK ADJUSTER, ESPECIALLY FOR RAILWAY CAR BRAKES

Bert Henry Browall, Malmo, Sweden, assignor to Svenska Aktiebolaget Bromsregulator, Malmo, Sweden, a corporation of Sweden Application February 15, 1935, Serial No. 6,750
In Germany November 20, 1934

8 Claims. (Cl. 188—200)

The present invention refers to such automatic slack adjusters for brakes, especially for railway car brakes, which are adapted both to reduce too great slacks between the brake shoes and the wheels, and also to increase too small slacks therebetween, and which comprise a pawl slidable in both directions in relation to a rod, such pawl being adapted in dependence upon the application movement of the brake, and when a certain amount of such movement has been performed, to be blocked to said rod against displacement relatively thereto, in order to permit the transmission of the braking power to the said rod.

The known slack adjusters of this type suffer from the drawback that an undesired displacement of the said pawl and a corresponding alteration of the amount of slack takes place when the brake is in released position and the slack adjuster is placed in tension as a result of the strain which is put on the brake rigging due to shocks, for instance when switching the cars, and which is caused by the fly action of the brake shoes etc. A car on which such an undesired alteration of the slacks has occurred, runs the risk, at the first braking and before the slack adjuster by normal action has again re-established the normal amount of slack, to have its brake piston stroke considerably augmented, and this will result in a reduction of the braking effect, or perhaps in no braking at all.

According to the present invention the aforesaid drawback is eliminated in such a manner that the said pawl of the slack adjuster is blocked to the aforesaid rod also when the brake is released, so that a variation of the slack is prevented in case a car on which the brake is released is subjected to switching shocks or any other influence which otherwise would result in the undesired effect referred to above.

The annexed drawing illustrates two mechanically different embodiments of the invention, both of them being shown in longitudinal section. In the drawing:—

Fig. 1 shows an embodiment of the invention in which the pawl adapted to be blocked to the rod after the brake piston has performed a certain length of stroke at the brake application movement, is also adapted to be blocked to the rod when the slack adjuster arrives at its end position corresponding to released brakes.

Fig. 2 shows another embodiment of the invention providing for the same manner of action as the embodiment according to Fig. 1, but by different mechanical means.

Fig. 3 shows diagrammatically one way of mounting the slack adjuster in the brake rigging of a brake.

The construction of the slack adjuster itself can be considered to be previously known, for instance from the U. S. Patent No. 2,035,228. According to this known construction, the slack adjuster consists of a main pawl 1, for instance in the shape of an expandible nut subdivided into a number of resiliently connected sectors, which coacts with a rod, for instance in the shape of a screw spindle 2. The nut sectors are exteriorly tapered and mounted within a cavity 4 provided at the end of a hollow rod 3 and having a correspondingly tapering seat 5. The said rod 3 and nut 1 are surrounded by and slidably mounted relatively to a cylindrical housing 7 the sliding movement of which is adapted to be controlled by means of a rod 15 provided with two adjustable stops 13 and 14 adapted alternately to come into contact with an ear 12 on the housing 7. The housing is divided into two compartments 9 and 10 by means of a partition 8, and one of said compartments 9 contains a coiled spring 11 mounted between the end wall 16 of the housing and a collar 3ª at the inner end of the hollow rod 3. The other compartment 10 contains a secondary pawl 6 in the shape of an expandible nut subdivided into a number of resiliently connected sectors adapted to take part in the sliding movement of the housing 7 and serving for the reduction of too great slack in a manner known per se. The partition 8 is provided with a tubular extension 19 surrounding the spindle 2 and adapted to abut the main pawl 1 and keep it out of contact with its tapering seat 5 during the dead motion limited by the stops 13, 14.

When to apply the brake the rod 3 is pulled (to the right in the drawing), this pull is at first transmitted to the rod 2 through the spring 11, housing 7 and pawl 6. If the slack is normal, the ear 12 reaches the stop 13, and the conical seat 5 then engages the conical end of the pawl nut 1 which is thereby blocked to the rod 2 and transmits the braking power to said rod 2. If the slack is excessive, the rod 3 continues to move after the housing 7 is held by stop 13, compressing the spring 11, so that the rod 2 is drawn through the pawl 6 and further into the housing 7, the enlarged end 3a of the rod 3 becoming spaced from the partition 8. During release the rod 3 with the pawl 1 slides over the rod 2 until the parts 3a, 8 again contact. If the slack is insufficient the brake is applied before the ear 12 reaches the stop 13. In this position of the brake the tubular extension 19 abuts the pawl 1 and keeps it out of contact with the seat 5. A further tractive effort on the rod 3 results in both pawls 1 and 6 being slided over the rod 2, the effort being transmitted from the rod 3 to the pawls by the intermediary of the spring 11, the housing 7, and by the partition 8 with the tubular extension 19 and the left end wall of the housing 7, respectively. The initial tension of the spring 11 is chosen so high that the said displacement of the pawls 1 and 6 takes place without any compression of the spring 11. The displacement proceeds in this manner until the ear 12 strikes the stop 13, after which the spring 11 is compressed and the clamping of pawl 1 takes place.

As far as described in the foregoing, the slack adjuster and the operation thereof is to be considered previously known, and while in the known construction of the slack adjuster pawl 1 at released brakes is held out of engagement with its seat 5 by the abutment member 19 and can slip on rod 2, the invention refers to means whereby the pawl 1 is blocked against displacement on the rod or screw spindle 2 when the ear 12 strikes the stop 14 at the release movement of the brake. This is effected by withdrawing the abutment member 19 from engagement with the pawl 1 at the end of the release movement of the brake, whereby to allow pawl 1 to engage its seat 5.

In the embodiment of the invention shown in Fig. 1, this blocking of the pawl is effected by a small relative sliding movement of the housing 7 in relation to the rod 3 when the ear 12 comes in contact with the stop 14. For this purpose the ear 12 is rockably mounted on a pin 17 on the end wall 16 of the housing 7, and the mounting is of such a kind that the ear 12 is permitted to rock away from the end of the housing, but when rocked in the opposite direction (clockwise in the drawing) it comes into contact with the end wall 16 so as to act as an arm rigidly secured to the housing 7 when coming in contact with the stop 13 at the displacement of the housing into the end position corresponding to applied brakes. At the displacement of the housing 7 into a position corresponding to released brakes, the ear 12 will rock a small angle when coming in contact with the stop 14, until coming in contact also with a fixed abutment 18 on the rod 3, whereby the ear 12 will cause the housing 7 to be displaced by a small quantity on the rod 3 under a slight compression of the spring 11. As the partition 8 and its tubular extension 19 are rigidly secured to the housing 7 they will then be displaced in relation to the tapering seat 5 connected with the rod 3, so that the end of the member 19, which otherwise will keep the pawl nut 1 out of contact with its seat in this position of the slack adjuster, will be drawn back from said seat and permit the seating of the tapering pawl nut 1 which is thereby blocked on rod 2. By the action of the ear 12, a certain amount of tension is transmitted between the rod 3 and the screw spindle 2 by means of the secondary pawl nut 6 and the housing 7, such tension securing a steady contact between the pawl nut 1 and its seat 5, and thereby a reliable locking action between the said nut and the screw spindle 2 is obtained for preventing undesired adjustment of the two-part rod 2, 3 when placed in tension as a result of switching shocks or the like.

In the embodiment of the invention according to Fig. 2, the contact between the main pawl nut 1 and its tapering seat 5 is made possible by permitting the end of the member 19a extending into the cavity 4 to draw out therefrom. For this purpose the member 19a is not rigidly connected with the partition 8 but, on the contrary, it is executed in the form of a sleeve slidably mounted in the partition 8 and connected with one end 22 of a two-armed lever rockably mounted in said wall and engaging an annular groove 21 in said sleeve. The other end 23 of said lever is adapted to coact with a control rod 24, or the like, in such a manner that the two-armed lever 22—23, in all of the positions of the ear 12 between stops 13a and 14a, except of the end position corresponding to released brakes, keeps the sleeve 19a displaced in relation to the partition 8 in such a manner that it prevents the contact between the pawl nut 1 and its tapering seat 5, as long as the said seat and the partition 8 are kept pressed against each other by the spring 11. In the position of the mechanism corresponding to released brakes, the displacement of the sleeve 19a away from the pawl nut 1 will be permitted due to the fact that the control rod 24 will release the lever arm 23, and then the pawl nut 1 will be permitted to go into contact with the seat 5. In the embodiment shown, the control rod 24 is connected with the stop 14a so that the said rod will also be correspondingly adjusted at the adjustment of said stop along the rod 15. As the stop 14a is to be adjusted so that it is in contact with the ear 12a when the brake is released, the correct position of the control rod 24 will also be simultaneously obtained. According to the embodiment shown, preferably a compression spring 35 may be inserted between the stop 13a and the ear 12a, such spring having for its object, in case the controlling rod 15 should fail to operate due to having worked loose for instance, to force the ear 12a into contact with the stop 14a in order to permit the contact of the pawl nut 1 with its tapering seat and thus make possible the transmission of braking power from rod 3 to rod 2.

The slack adjuster can be mounted in different ways in the brake rigging, and for the sake of illustration one way is shown in Fig. 3 in which 40 represents the brake cylinder and 41 and 42 a live and dead brake lever, respectively, the slack adjuster being connected in, or constituting, the main pull rod connected to one of said levers, whereas the operating rod 15 is connected to the other of said levers.

What I claim and desire to secure by Letters Patent is:—

1. In an automatic slack adjuster for brakes of the character described, a two-part rod the parts of which are relatively slidable in both directions, a pawl carried by one of said rod parts and adapted to cooperate with the other rod part, said first mentioned rod part having a seat for said pawl, whereby said pawl is blocked against displacement relatively to said second mentioned rod part in one direction when said pawl engages said seat, a withdrawable member for holding said pawl out of engagement with said seat for allowing said pawl to slip relatively to said second mentioned rod part in the said direction, means controllable in dependence upon the application movement of the brake and adapted to withdraw said withdrawable member from said pawl to allow engagement of said pawl with said seat at the application movement of the brake in a certain position thereof, and means controllable in dependence upon the release movement of the brake and adapted to withdraw said withdrawable member from said pawl to allow engagement of said pawl with said seat also at the release movement of the brake in the end position thereof corresponding to released brake.

2. In an automatic slack adjuster for brakes of the character described, a hollow rod, a screw threaded spindle projecting into said hollow rod and axially movable relatively thereto in both directions, an expandible pawl nut cooperating with said screw spindle and housed within one end of said hollow rod and having a tapering circumferential surface, a tapering seat provided at the said end of said hollow rod, with which said tapering, expandible pawl nut is adapted to cooperate for blocking said pawl nut against displacement on said screw threaded spindle in one direction, a relatively movable abutment member for holding said nut clear of said seat, means for controlling said relatively movable abutment member in dependence upon the application movement of the brake, whereby said abutment member is moved to allow for said pawl nut being blocked against displacement on said screw threaded spindle in said direction by contact with said tapering seat at a predetermined position of said application movement, and means for controlling said relatively movable abutment member in dependence upon the release movement of the brake, whereby said abutment member is moved to allow for said nut being blocked against axial displacement on said screw threaded spindle in said direction by contact with said tapering seat at the end position of said release movement.

3. An automatic slack adjuster as claimed in claim 2, in which said means for controlling said relatively movable abutment member for said nut in dependence upon the application movement of the brake is movable relatively to an operating member therefor between two stops carried on said operating member, and in which said means for controlling said relatively movable abutment member for said nut in dependence upon the release movement of the brake is operatively connected to said operating member.

4. An automatic slack adjuster as claimed in claim 2, in which said means for controlling said relatively movable abutment member for said nut in dependence upon the application movement of the brake is movable relatively to an operating member therefor between two stops carried on said operating member, and in which said means for controlling said relatively movable abutment member for said nut in dependence upon the release movement of the brake is operatively connected to said operating member, spring means being provided for relatively urging said operating member and said means for controlling said relatively movable abutment member for said nut in dependence upon the application movement of the brake in a direction for moving said relatively movable abutment member, through said means for controlling it in dependence upon the release movement of the brake, in a direction to allow for said nut being blocked against displacement on said screw threaded spindle by contact with said tapering seat.

5. In an automatic slack adjuster for brakes of the character described, a hollow rod, a screw threaded spindle projecting into said hollow rod and axially movable relatively thereto in both directions, an expandible pawl nut cooperating with said screw threaded spindle and housed within one end of said hollow rod and having a tapering portion, a tapering seat provided at the said end of said hollow rod, with which said tapering portion of said pawl nut is adapted to make contact for blocking said nut against displacement on said screw threaded spindle in one direction, a relatively movable abutment member for holding said pawl nut clear of said seat, a housing surrounding said hollow rod and axially movable relatively thereto and carrying said abutment member, an operating member adapted to be moved relatively to said housing in dependence upon the movement of the brake, two spaced stops on said operating member, an arm pivoted to said housing and engaged between said stops on said operating member so as to be acted upon in one direction at the application of the brake and in the other direction at the release of the brake, and abutments for said arm on opposite sides thereof on said housing and said hollow rod, respectively, whereby said housing and said hollow rod are relatively displaced in a direction for moving said abutment member for said pawl nut so as to allow for said nut being blocked against displacement in the aforesaid direction on said screw threaded spindle by contact with said tapering seat at a predetermined position of the application movement of the brake and at the end position of the release movement of the brake, respectively.

6. In an automatic slack adjuster for brakes of the character described, a hollow rod, a screw threaded spindle projecting into said hollow rod and axially movable relatively thereto in both directions, an expandible pawl nut cooperating with said screw spindle and housed in one end of said hollow rod and having a tapering end, a tapering seat in said end of said hollow rod, with which said tapering end of said pawl nut is adapted to make contact for blocking said nut against displacement in one direction on said screw threaded spindle, a relatively movable abutment sleeve for holding said pawl nut clear of said tapering seat, a housing surrounding said hollow rod and axially movable relatively thereto and provided with a projecting ear, an operating member adapted to be moved relatively to said housing in opposite directions at application and release of the brake, respectively, and provided with two stops on opposite sides of said ear on said housing, and means operatively connecting said movable abutment sleeve with said operating member for positively moving said abutment sleeve relatively to said housing in one direction to disengage said pawl nut from said seat at the beginning of the application movement of the brake and for allowing such relative movement in the other direction to allow for said pawl nut being blocked against displacement on said screw spindle by contact with said tapering seat at the end position of the release movement of the brake.

7. An automatic slack adjuster as claimed in claim 6, in which said abutment sleeve is axially slidable in a central opening in a partition provided in said housing and limiting axial movement between said housing and said hollow rod in one direction, and in which said means operatively connecting said abutment sleeve with said operating member consists of a lever carried by said housing and having one end engaged with said slidable abutment sleeve and the other end in the path of a bar carried by said operating member.

8. An automatic slack adjuster as claimed in claim 6, in which a spring is disposed between said ear on said housing and one of said stops on said operating member for moving said operating member, in case it should fail to operate in dependence upon movement of the brake due, for instance, to having worked loose, relatively to said housing in a direction for allowing movement of said slidable abutment sleeve for said pawl nut relatively to said housing so as to allow for said pawl nut being blocked against displacement on said screw threaded spindle by contact with said tapering seat.

BERT HENRY BROWALL.